US011047999B2

(12) United States Patent
Liu et al.

(10) Patent No.: US 11,047,999 B2
(45) Date of Patent: Jun. 29, 2021

(54) SYSTEM AND METHOD FOR SEISMIC IMAGING

(71) Applicant: Chevron U.S.A. Inc., San Ramon, CA (US)

(72) Inventors: Huafeng Liu, Houston, TX (US);
Norman Ross Hill, Houston, TX (US);
Daniel Johnson, Houston, TX (US);
Konstantin Osypov, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 329 days.

(21) Appl. No.: 16/244,936

(22) Filed: Jan. 10, 2019

(65) Prior Publication Data

US 2020/0225376 A1 Jul. 16, 2020

(51) Int. Cl.
*G01V 1/28* (2006.01)
*G01V 1/30* (2006.01)
*G01V 1/32* (2006.01)

(52) U.S. Cl.
CPC .............. *G01V 1/282* (2013.01); *G01V 1/305* (2013.01); *G01V 1/325* (2013.01); *G01V 2210/66* (2013.01)

(58) Field of Classification Search
CPC ........ G01V 1/282; G01V 1/305; G01V 1/325; G01V 2210/66; G01V 99/005
See application file for complete search history.

(56) References Cited

U.S. PATENT DOCUMENTS

| 5,274,605 A | 12/1993 | Hill |
| 6,882,939 B2 | 4/2005 | Homans et al. |
| 6,889,142 B2 | 5/2005 | Schonewille |
| 7,373,252 B2 | 5/2008 | Sherrill et al. |
| 9,013,956 B2 | 4/2015 | Hill |
| 9,366,771 B2 | 6/2016 | Dasgupta et al. |
| 2006/0056272 A1 | 3/2006 | Hill |
| 2008/0137480 A1 | 6/2008 | Macneill |
| 2009/0238040 A1 | 9/2009 | Duncan et al. |
| 2011/0096627 A1 | 4/2011 | Hill |
| 2014/0278299 A1 | 9/2014 | Hill |
| 2020/0225376 A1* | 7/2020 | Liu ................ G01V 99/005 |

FOREIGN PATENT DOCUMENTS

| CN | 108072892 A | 5/2018 |
| WO | WO-2020144526 A1 * | 7/2020 ........... G01V 99/005 |

OTHER PUBLICATIONS

C.Stork et al., "Linear Aspects of Tomographic Velocity Analysis", Geophysics, vol. 56, No. 4, Apr. 1991, p. 483-495.
Cerveny, V. et al., "Computation of Wave Fields in Inhomogeneous Media-Gaussian Beam Approach", Geophys. J.R. astr. Soc.,1982, 70, p. 109-128.

(Continued)

*Primary Examiner* — Daniel Pihulic
(74) *Attorney, Agent, or Firm* — Marie L. Clapp

(57) ABSTRACT

A method is described for seismic imaging that will produce a seismic image with correctly focused and positioned reflectors. This is accomplished by adding physical geological information to a beam tomography process to generate an updated earth model for the seismic imaging. The method may be executed by a computer system.

15 Claims, 8 Drawing Sheets
(3 of 8 Drawing Sheet(s) Filed in Color)

(56) References Cited

OTHER PUBLICATIONS

Claerbout "Earth Soundings Analysis: Processing Versus Inversion", Stanford University, Mar. 23, 2004, p. 1-334.
Deregowski, S.M., "Common-Offset Migrations and Velocity Analysis", First Break, vol. 8, No. 6, Jun. 1990, p. 225-234, The British Petroleum Company, Britannic House, Moor Lane, London EC2 9BU, UK.
Dix, Hewitt C., "Seismic Velocities from Surface Measurements", Geophysics, vol. XX, No. 1, Jan. 1995, p. 68-86, California Institute of Technology, Pasadena, California.
Larner, Kenneth L. et al., "Depth Migration of Images Time Sections", Geophysics, vol. 46, No. 5, May 1981, p. 734-750, The Society of Exploration Geophysicists.
Levin, F.K. "Apparent Velocity from Dipping Interface Reflections", Geophysics, vol. 36, No. 3, Jun. 1971, p. 510-516, The Society of Exploration Geophysicists.
Nolet, Guust, "Partitioned Waveform Inversion and Two-Dimensional Structure Under the Network of Autonomously Recording Seismographs", Journal of Geophysical Research, vol. 95, No. B6, p. 8499-8512, Jun. 10, 1990, The American Geophysical Union.
Plessix, R.-E., "A Review of the Adjoint-State Method for Computing the Gradient of a Functional with Geophysical Applications", Geophys. J. Int., 167, 2006, p. 495-503, Shell International Exploration and Production B.V.
Pratt, Gerhard R., "Seismic Waveform Inversion in the Frequency Domain, Part 1: Theory and Verification in a Physical Scale Model", Geophysics, vol. 64, No. 3, May-Jun. 1999, p. 888-901, The Society of Exploration Geophysicists.
Pratt, Gerhard R. et al., "Seismic Waveform Inversion in the Frequency Domain, Part 2: Fault Delineation in Sediments Using Crosshole Data", Geophysics, vol. 64, No. 3, May-Jun. 1999, p. 902-914, The Society of Exploration Geophysicists.
Woodward, Marta Jo, "Wave-Equation Tomography", a Dissertation Submitted to the Department of Geophysics and the Committee on Graduate Studies of Stanford University, Dec. 1989, Stanford Exploration Project No. 62.
De Monvel, Anne Boutet et al., "The Conjugate Operator Method: Application to Dirac Operators and to Stratified Media", IMA Preprint Series #1341, Oct. 1995, Institute for Mathematics and Its Applications, University of Minnesota, Minneapolis, Minnesota 55455, US.
Leung, Shingyu et al., "Eulerian Gaussian Beams for High-Frequency Wave Propagation", Geophysics, vol. 72, No. 5, Sep.-Oct. 2007, p. SM61-SM76, The Society of Exploration Geophysicists.
Klimes, Ludek, "Hermite-Gaussian Beams in Inhomogeneous Elastic Media", Studia Geoph. et geod. 27, 1983, p. 354-365, Institute of Geophysics, Charles University, Prague.
Nowack, Robert L., "Correlation Migration Using Gaussian Beams of Scattered Teleseismic Body Waves", Bulletin of the Seismological Society of America, vol. 96, No. 1, Feb. 2006, p. 1-10.
Claerbout, Jon F., "Image Estimation by Example: Geophysical Soundings Image Construction—Multidimensional Autoregression", Stanford University, Feb. 12, 2013.
Albertin, U. et al., "Adjoint Wave-Equation Velocity Analysis", SEG Annual Meeting, Oct. 1-6, 2006, New Orleans, Louisiana, Society of Exploration Geophysicists.
Hill, Ross N., "Prestack Gaussian-Beam Depth Migration", Geophysics, vol. 66, No. 4, Jul.-Aug. 2001, p. 1240-1250, The Society of Exploration Geophysicists.
Biondi, Biondo et al., ""Focusing" Eikonal Equation and Global Tomography", Stanford Exploration Project, Report Sergey, Nov. 9, 2000, p. 403-417.
Lee, Ki Ha et al., "3-D Full Waveform Inversion of Seismic Data; Part I. Theory", Lawrence Berkeley National Laboratory, 2003, eScholarship Repository, University of California.
Bube, Kenneth P. et al., "Hybrid $\ell_1/\ell_2$ Minimization with Applications to Tomography", Geophysics, Jul.-Aug. 1997, vol. 62, No. 4, p. 1183-1195, The Society of Exploration Geophysicists.
Gray, Samuel H., "Gaussian Beam Migration of Common-Shot Records," Geophysics, Jul.-Aug. 2005, vol. 70, No. 4, p. S71-S77, The Society of Exploration Geophysicists.
Sun, Yonghe et al., "3-D Prestack Kirchhoff Beam Migration for Depth Imaging", Geophysics, Sep.-Oct. 2000, vol. 65, No. 5, p. 1592-1603, The Society of Exploration of Exophysicists.
PCT International Search Report and Written Opinion, dated Mar. 20, 2020, issued in International Application No. PCT/IB2019/061258, filed on Dec. 23, 2019, 26 pages.

\* cited by examiner

SYSTEM AND METHOD FOR SEISMIC IMAGING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for imaging the Earth's subsurface using seismic data, particularly for identifying hydrocarbon reservoirs in the vicinity of complex structures in order to drill wells into the hydrocarbon reservoirs and produce the hydrocarbons.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Seismic imaging (e.g., Kirchhoff migration, wave migration, least squares migration, etc.) generally requires an earth model through which the recorded seismic energy (and modeled seismic energy for some imaging methods) is propagated. The earth model is a model of the physical properties of the subsurface volume of interest, including one or more of primary wave velocity ($V_P$), secondary wave velocity ($V_S$), density ($\rho$), and the like. Seismic imaging of hydrocarbon reservoirs is challenging, especially in the areas below complex structures. In such cases, the subsurface structures are poorly or ambiguously defined in the earth model, causing huge uncertainty in determining the hydrocarbon potential of these reservoirs. One indicator of a subsurface imaging problem is mis-positioned reflectors or, in some cases, geologically implausible reflectors. Conventional seismic imaging technologies, including ray-based and wave-based methods, often have trouble positioning the reflectors precisely, due to limitations of seismic data and corresponding resolvability. When depth information from wells is available, depth calibration can be performed, often after the full-imaging process. This sequential approach treats reflector focusing and positioning independently. This is not ideal because the focusing and positioning processes are coupled via the earth model.

Depth constraints are not typically used in earth model building process in seismic imaging. They are not used because adding direct depth constraints is often problematically inconsistent with the gradient direction that is used in most conventional approaches.

A geological plausible image is always desirable in hydrocarbon exploration. In practice, seismic images may show geologically implausible reflectors when no constraints are used. U.S. Pat. No. 9,366,771 developed a localized migration velocity modeling and image improvement method to position reflectors at desired locations. This process can make the reflectors geologically plausible. Nevertheless, the corresponding image may be degraded because the lack of pre-stack constraints results in poor focusing. This is not ideal because the unfocused reflectors imply unresolved earth model attributes in other regions of the image, posing additional risks in evaluating hydrocarbon potential.

There exists a need for resolving reflector positioning and pre-stack focusing simultaneously in seismic imaging to allow better seismic interpretation of potential hydrocarbon reservoirs.

SUMMARY

In accordance with some embodiments, a method of seismic imaging including receiving a seismic dataset and geological information for a subsurface volume of interest; transforming the seismic dataset into a data beam set; receiving an earth model; computing traveltime variations from the data beam set based on the geological information and the earth model; deriving an updated earth model based on the traveltime variations; performing seismic imaging of the seismic dataset using the updated earth model to generate a seismic image with correctly focused and positioned reflectors; and identifying geologic features based on the seismic image is disclosed. The method may be an iterative method that uses the updated earth model to further refine computing traveltime variations and deriving a new updated earth model.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1A:
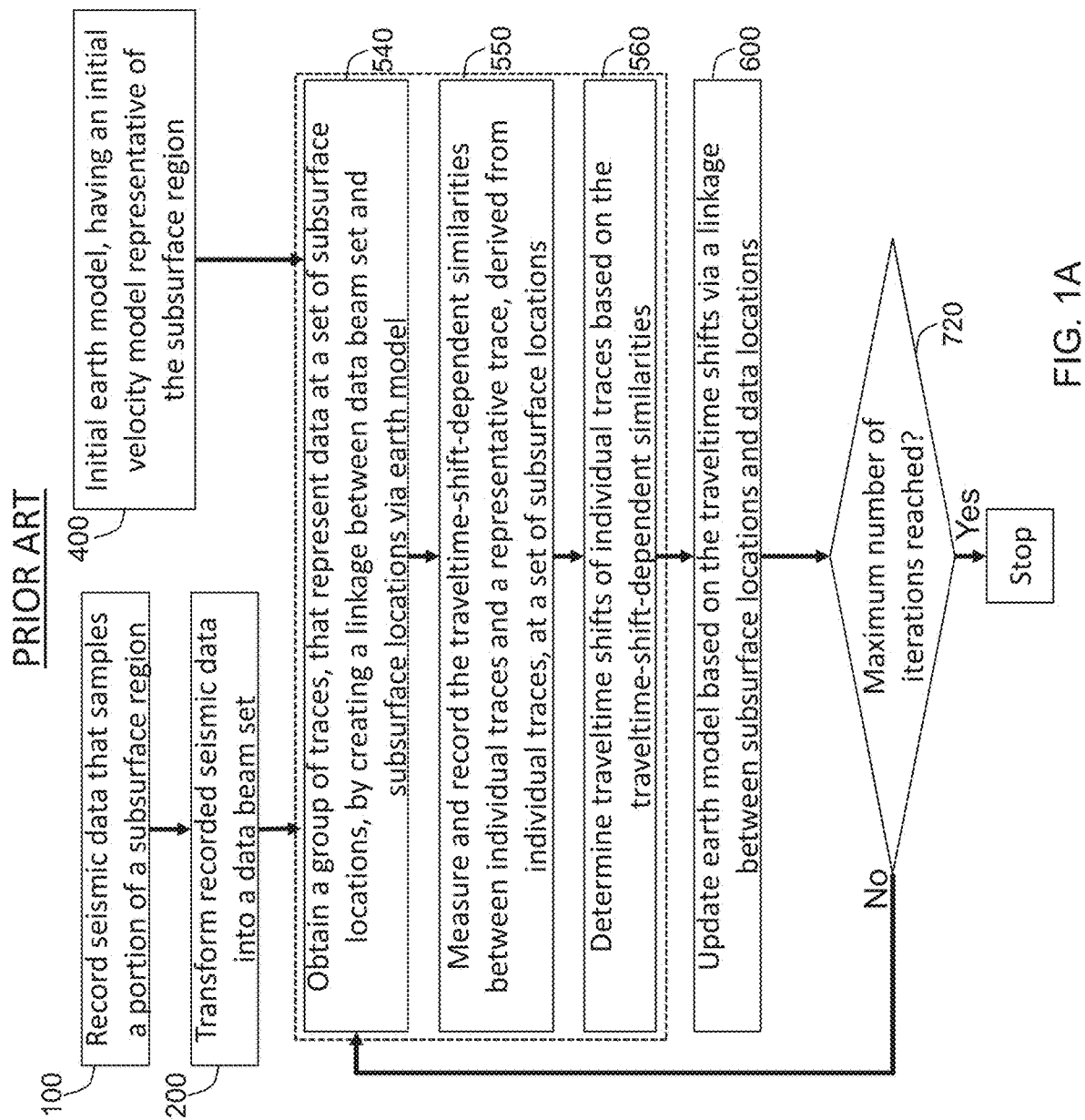
FIG. 1A illustrates a flowchart of a method of beam tomography.

Described below are methods, systems, and computer readable storage media that provide a manner of seismic imaging. These embodiments are designed to be of particular use for seismic imaging of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

The present invention includes embodiments of a method and system for seismic imaging that will produce a seismic image with correctly focused and positioned reflectors. This is accomplished by adding physical geological information to a beam tomography process to generate an updated earth model for the seismic imaging. Beam tomography may be performed, for example, using the methods disclosed in U.S. Pat. No. 9,013,956, which is incorporated herein in its entirety. However, conventional beam tomography methods such as that of U.S. Pat. No. 9,013,956 do not disclose any method of including physical geological information in the earth model updating process.

Figure 2:
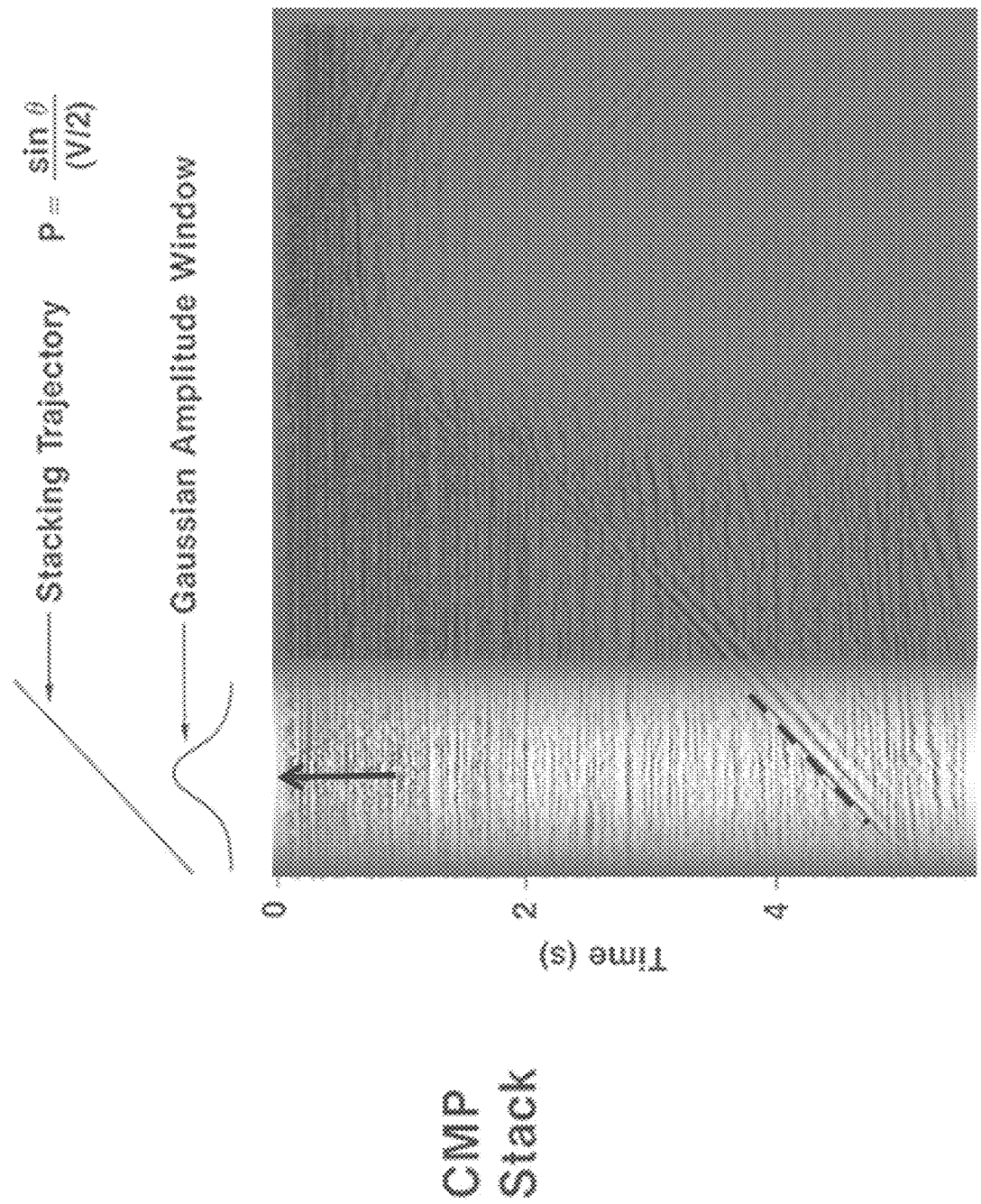
FIG. 2 illustrates the process to transform recorded seismic data into a data beam set.

FIG. 1A shows a flow chart of the beam tomography process. The method receives as input field recorded seismic data that samples a portion of a subsurface region (step 100 in FIG. 1A). The recorded seismic data may have had some pre-processing such as noise attenuation, spectral balancing, or the like performed. Then a transform is made to the seismic data to form a data beam set (step 200 in FIG. 1A). The transformation is accomplished by first sorting the data into the common-mid-point offset domain and then beam steering the sorted data along stacking trajectories, according to a set of ray parameters, with Gaussian weights as a function of positions, as shown, for example, in FIG. 2.

The following steps are iterative, based on a user-defined number of iterations. The first step in the iteration (operation 540 in FIG. 1A) is to create a linkage between the transformed data and a set of subsurface locations. The computer or the user can define the set of subsurface locations, such as a set of reflectors of interest. The linkage is created by a set of ray-paths through an earth model (the initial earth model being received at operation 400 in FIG. 1A). The ray-paths link the set of subsurface locations, where the reflectors of interest are located, and the surface locations, where seismic data are recorded. The traveltimes of seismic events in the recordings can be compared against traveltimes along the ray paths.

The second step of the iteration (operation 550 in FIG. 1A) is to measure the similarities of the traces sampling the same surface locations. The measurement of trace similarities is crucial in earth model update. This similarity is a widely accepted assumption that all the signals that sample the same subsurface location exhibit the same seismic responses. An embodiment may employ cross-correlation as the measurement of similarity. The cross-correlations are between each individual trace, representing a set of sources and receivers sampling a subsurface location, and a representative trace, derived from stacking all the individual traces sampling the same subsurface location. The cross-correlation values are computed for a range of time shifts for all individual traces sampling one subsurface location and at all subsurface locations of interest.

The third step of the iteration (operation 560 in FIG. 1A) is to determine traveltime shifts of individual traces sampling the same surface location and repeat for all subsurface locations. To tolerate noises and avoid local minima, an embodiment may employ a Monte-Carlo approach in selecting traveltime shifts. The probability distribution function of traveltime shifts is defined as:

$$pdf(\tau) = e^{\frac{cc(\tau) - cc_{max} - \left(\frac{\tau}{\tau_\lambda}\right)^2}{T}} \quad (1)$$

where $\tau$ is traveltime shift relative to the current model, $\tau_\lambda$ is a characteristic traveltime shift defined by the user, cc is the cross-correlation value corresponding to a traveltime shifts $\tau$, $cc_{max}$ is the maximum cross-correlation value among all traveltime shifts, T is temperature defined by the user and pdf is a probability according to traveltime shift $\tau$. Therefore, a traveltime shift, $\tau$, can be determined probabilistically in each iteration.

The fourth step of the iteration (step 600 in FIG. 1A) is to update earth model based on the traveltime shifts. The traveltime residual may be defined based on traveltime shifts:

$$dt_{Resid}(\vec{x}, \vec{p}) = -\tau(\vec{x}, \vec{p}) \quad (2)$$

where $dt_{Resid}(\vec{x}, \vec{p})$ is the residual traveltime that will be used in earth model update; $\tau(\vec{x}, \vec{p})$ is the traveltime shifts at locations ($\vec{x}$) and directions ($\vec{p}$) that is chosen by random sampling of distribution (1). Then a linkage is created between subsurface locations and recorded data location via ray paths. The traveltime related parameters along these ray paths, such as velocity, can be linked to the traveltime residuals of traces at subsurface locations. To focus reflectors (maximize similarities among all traces at subsurface locations), the changes of required traveltime-related parameters are calculated from traveltime residuals, and then are distributed along ray paths (Stork and Clayton, 1991). After a number of iterations, the earth model is updated so that the maximum similarity of the traces sampling the same subsurface locations is achieved.

The above four steps will be repeated until the maximum number of iterations is reached. During the iterations, the temperature and characteristic traveltime shift will be updated to help the convergence of the Monte-Carlo process. All the traces will be updated corresponding to updated earth model. Therefore, the probabilistic distribution function (pdf in eq. 1) will be update during iterations. As noted earlier, this process may not produce an earth model that will position all seismic reflectors accurately during seismic imaging.

Figure 1B:
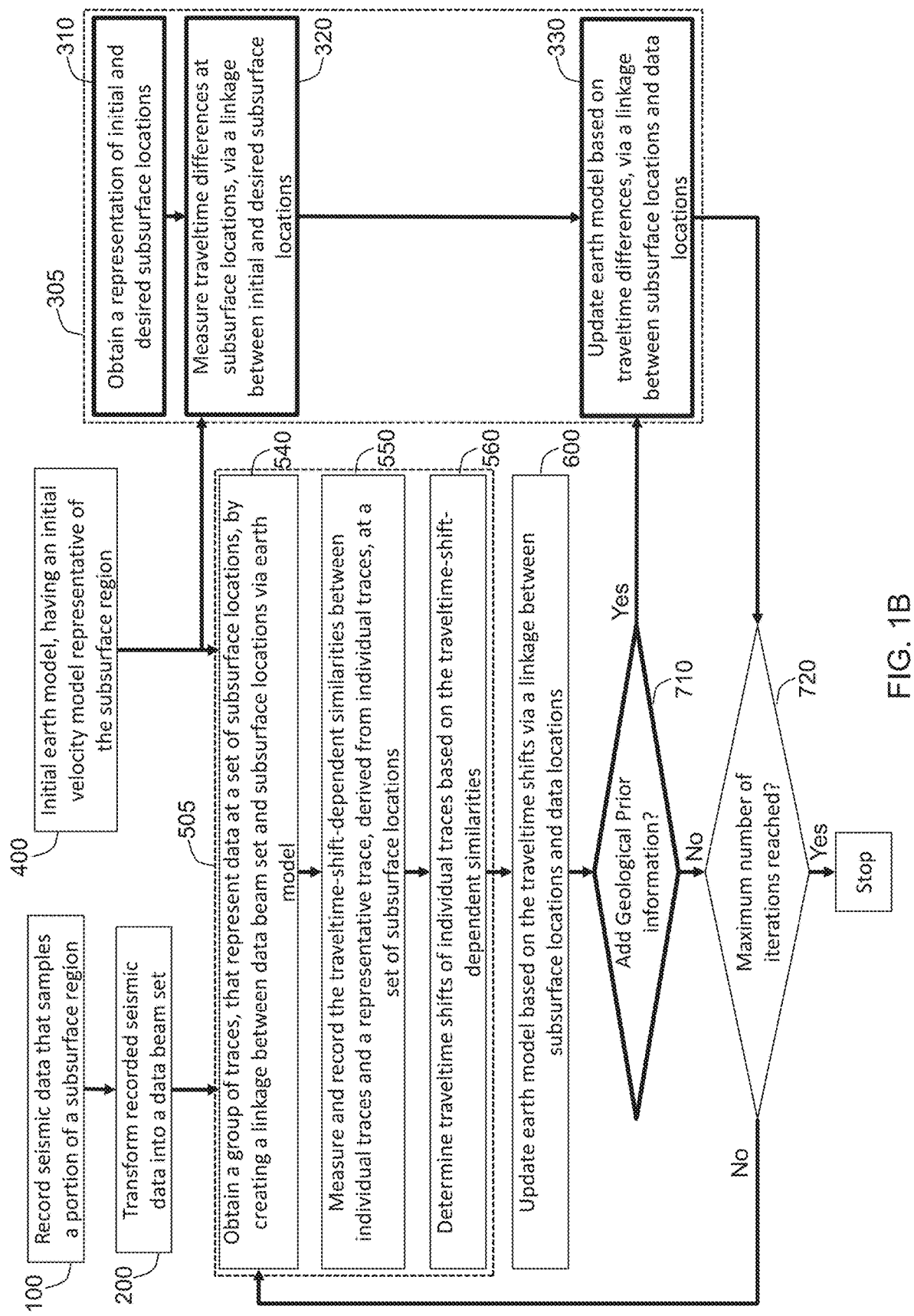
FIG. 1B illustrates a flowchart of a method of structurally-constrained beam tomography, in accordance with some embodiments.

To produce a more accurate updated earth model, the present invention imposes structural constraints in the beam tomography process. FIG. 1B shows a flow chart of the invention. Compared to FIG. 1A, the steps imposing structural constraint are in dashed box 305. The imposed structural information is applied after each earth-model update (decision 710 in FIG. 1B). There are three innovative steps in applying structural constraint. They consist of: I) obtaining a representation of geological prior information (step 310 in FIG. 1B), II) measuring traveltime differences based on prior information (step 320 in FIG. 1B) and III) updating earth model based on traveltime differences (step 330 in FIG. 1B). The details of these three steps are described below.

Figure 3:
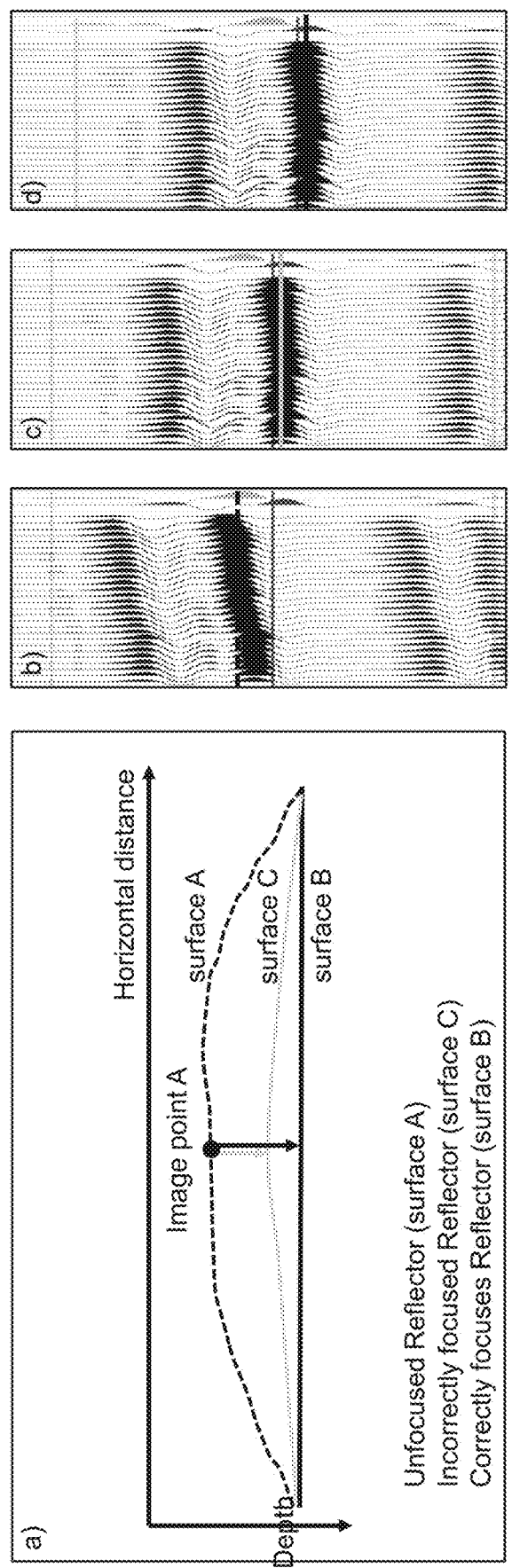
FIG. 3 illustrates a reflector positioning problem and potential improvement made by structurally-constrained beam tomography.

The first step (310 in FIG. 1B) is to obtain a representation of geological constraints. In seismic interpretation, it is not unusual that a geologically implausible reflector appears on seismic images (dashed blue reflector in FIG. 3 panel a). These reflectors will show moveout along a seismic gather as seen in FIG. 3 panel b. Even after performing a conventional beam tomography process, such as shown in FIG. 1A, the reflector may still be incorrectly focused and positioned, as demonstrated by surface C in FIG. 3 panel a. Due to the beam tomography, the reflector seen in the seismic gather in FIG. 3 panel c does not have moveout but the reflector is still implausible. In those cases, a geologically plausible reflector (green reflector in FIG. 3 panel a) may be obtained from an independent source, such as well markers, structural models, or experienced-based interpretations. This geologically plausible reflector will also show no moveout in the seismic gather as shown in FIG. 3 panel d. Both the geologically implausible (undesired) reflector locations and the geologically plausible (desired) locations are spatial information. Therefore, both can be characterized as surfaces. The desired and undesired surfaces can be mapped in an interpretive application, such as Schlumberger's Petrel software platform.

Figure 4A:
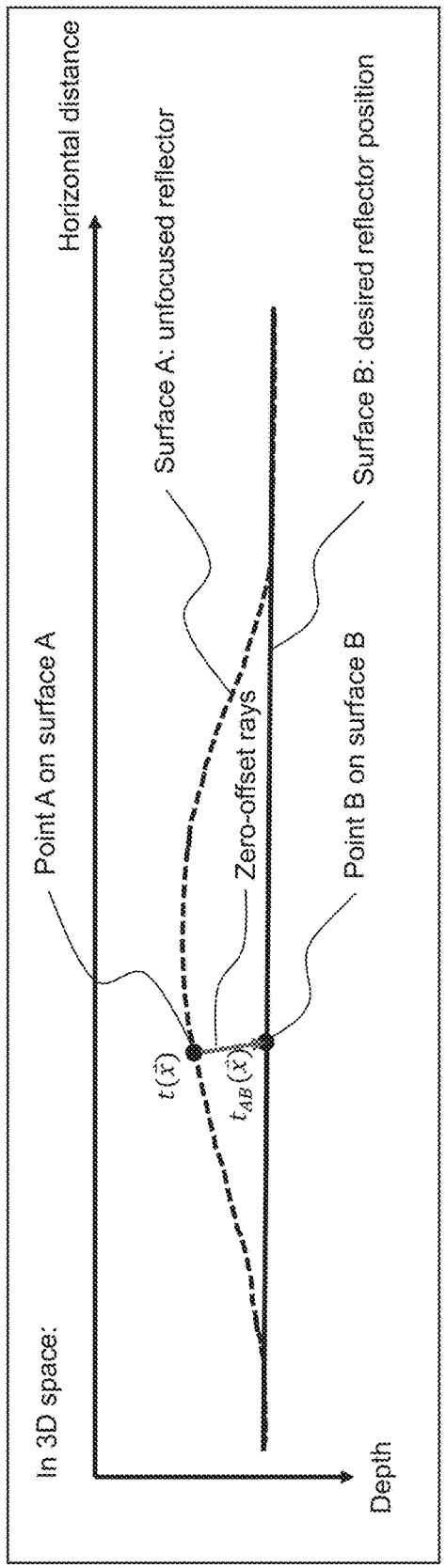
FIG. 4A illustrates the linkage between initial reflector position and desired reflector position.
Figure 4B:
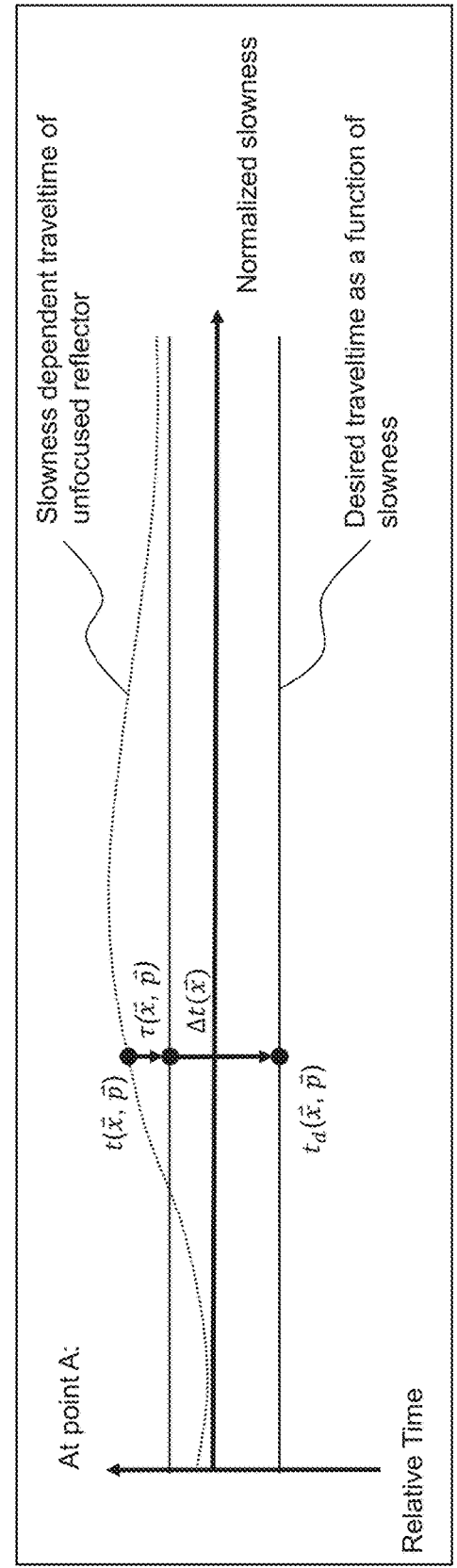
FIG. 4B illustrates the linkage between the initial traveltime and the desired traveltime at a single spatial location.

The second step (320 in FIG. 1B) is to measure traveltime differences based on prior information. After step 310, the process has a surface representing undesired reflector position (surface A in FIG. 3 panel a and FIG. 4A) and a surface representing desired surface position (surface B in FIG. 3 panel a and FIG. 4A). A linkage is created between these two surfaces by shooting rays from the undesired surfaces to the desired surfaces, in a direction normal to the undesired surface. It is then possible to compute the two-way traveltime ($t_{AB}$ in FIG. 4A) along the normal rays based on the initial earth model. Next, a linkage is created between traveltime ($t_{AB}$ in FIG. 4A) and the desired time shifts (Δt in FIG. 4B). To refocus signal from point A with traveltime of $t(\vec{x})$ to point B (FIG. 4A), the traveltime of that signal at point B will need to be $t(\vec{x})$ after refocusing. This requires a new traveltime at point A to allow the signal travel additional time of $t_{AB}$ to arrive at point B. FIG. 4B shows signals from various directions arriving at point A. The process defines the time shift required to refocus from undesired surface to desired surface as desired time shift (Δt in FIG. 4B). Based on the direction of rays, the desired time shifts (Δt in FIG. 4B) can be obtained from the normal-ray traveltime ($t_{AB}$ in FIG. 4A).

The third step (330 in FIG. 1B) is to update the earth model according to the desired time shifts. To do this update, the process defines residual traveltimes based on the desired time shifts (Δt in FIG. 4B) and then updates the earth model to minimize the residual traveltimes. There are two methods that may be used to set the residual traveltimes.

The first method is absolute depth control of reflectors, which is available when well markers are available and spatial variation of reflector can be derived. In this case, the residual traveltime for each individual trace at each position is obtained by differencing the average traveltime of reflector (solid blue line in FIG. 4B) and the desired time shifts (Δt($\vec{x}$) in FIG. 4B):

$$dt_{Resid}(\vec{x}, \vec{p}) \cong -\left(\frac{1}{n_p}\sum_{\vec{p}} \tau(\vec{x}, \vec{p}) - \Delta t(\vec{x})\right) \quad (3)$$

where $dt_{Resid}(\vec{x}, \vec{p})$ is the residual traveltime that will be used in earth model update; $\tau(\vec{x}, \vec{p})$ is the traveltime shifts at individual locations ($\vec{x}$) and directions ($\vec{p}$); $n_p$ is the number of available directions; Δt($\vec{x}$) is the desired traveltime shift that is computed along normal ray paths.

The second method is relative depth control of reflectors, which is available when depth variation of reflectors can be defined, such as a flat rather than undulating base of salt. In this case, the residual traveltime is obtained by differencing the relative average traveltime and the relative desired time shifts at each location (eq. 4). The relative average traveltime is defined as the average traveltime at a spatial location relative to the average of average-traveltime at all spatial locations on a reflector. The relative desired time shift is defined as the desired time shifts minus the average of desired time shifts at all spatial locations on a reflector. This can be further explained by the equation below:

$$dt_{Resid}(\vec{x}, \vec{p}) \cong \\ -\left(\frac{1}{n_p}\sum_{\vec{p}} \tau(\vec{x}, \vec{p}) - \frac{1}{n_p n_x}\sum_{\vec{x},\vec{p}} \tau(\vec{x}, \vec{p})\right) - \left(\Delta t(\vec{x}) - \frac{1}{n_x}\sum_{\vec{x}} \Delta t(\vec{x})\right) \quad (4)$$

where $n_x$ is the number of available spatial locations, other notations are the same as those in eq. 3.

After the residual traveltime is obtained, the earth model is updated from the residual traveltime via ray paths. This is the same inversion process as that in step 600 of FIG. 1B with a different input, according to eq. 3 or eq. 4.

These embodiments describe ways to implement structurally-constrained beam tomography. The resultant updated earth model can then be used in a seismic imaging process (e.g., migration or the like) to produce a seismic image. Examples of seismic images with the velocity attribute of the earth model overlain can be seen in FIG. 5 and FIG. 6.

Figure 5:
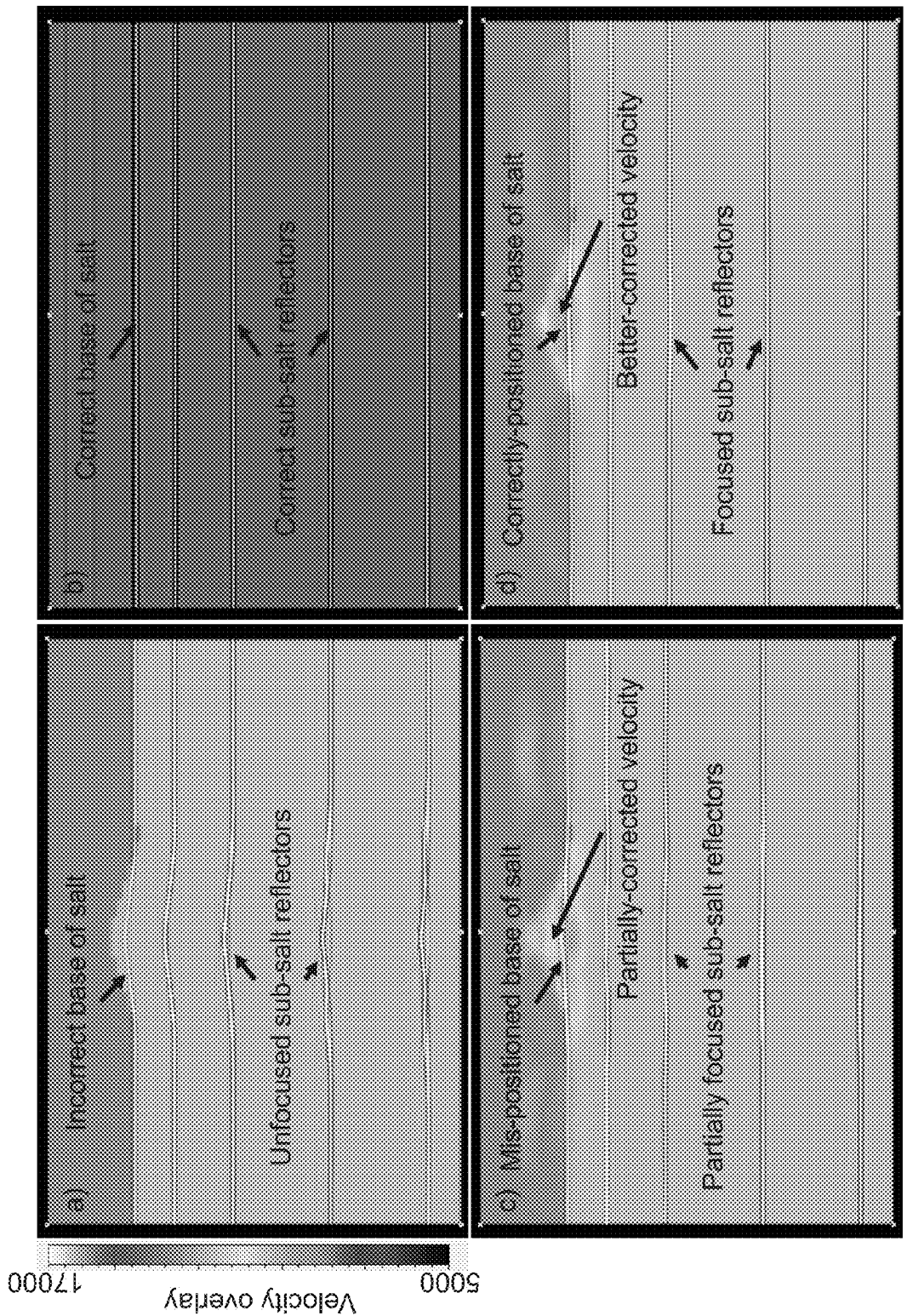
FIG. 5 illustrates a synthetic case where the base-of-salt image is improved as a result of some embodiments.

FIG. 5 is an example of a mis-interpreted base-of-salt case, which is typical in Gulf of Mexico. FIG. 5 panel a) shows the sub-salt imaging problem caused by incorrect interpretation of salt boundary. FIG. 5 panel b) shows the correct reflector positions with correct salt boundary, which is the "perfect" answer. FIG. 5 panel c) shows velocity model and corresponding image after the conventional beam tomography (such as the process of FIG. 1A). Both salt velocity and sub-salt reflectors are improved. On the other hand, the base-of-salt reflector is not positioned correctly and the sub-salt reflectors are not focused well. FIG. 5 panel d) shows the velocity model and corresponding image after structurally-constrained beam tomography. In this case, the structural input is the interpretation of base-of-salt in FIG. 5 panel a) and a desired base-of-salt surface from FIG. 5 panel b). The salt velocity and sub-salt reflectors are imaged reasonably well in terms of both focusing and positioning. This case demonstrates the capability of structurally-constrained beam tomography to improve sub-salt images, by correctly recovering velocity error in the earth model, based on structural (i.e., physical geological) input. Although this example uses a flat, horizontal desired base-of-salt, it should be noted that this is not meant to be limiting; the embodiments provided herein may use any desired physical geological information.

Figure 6:
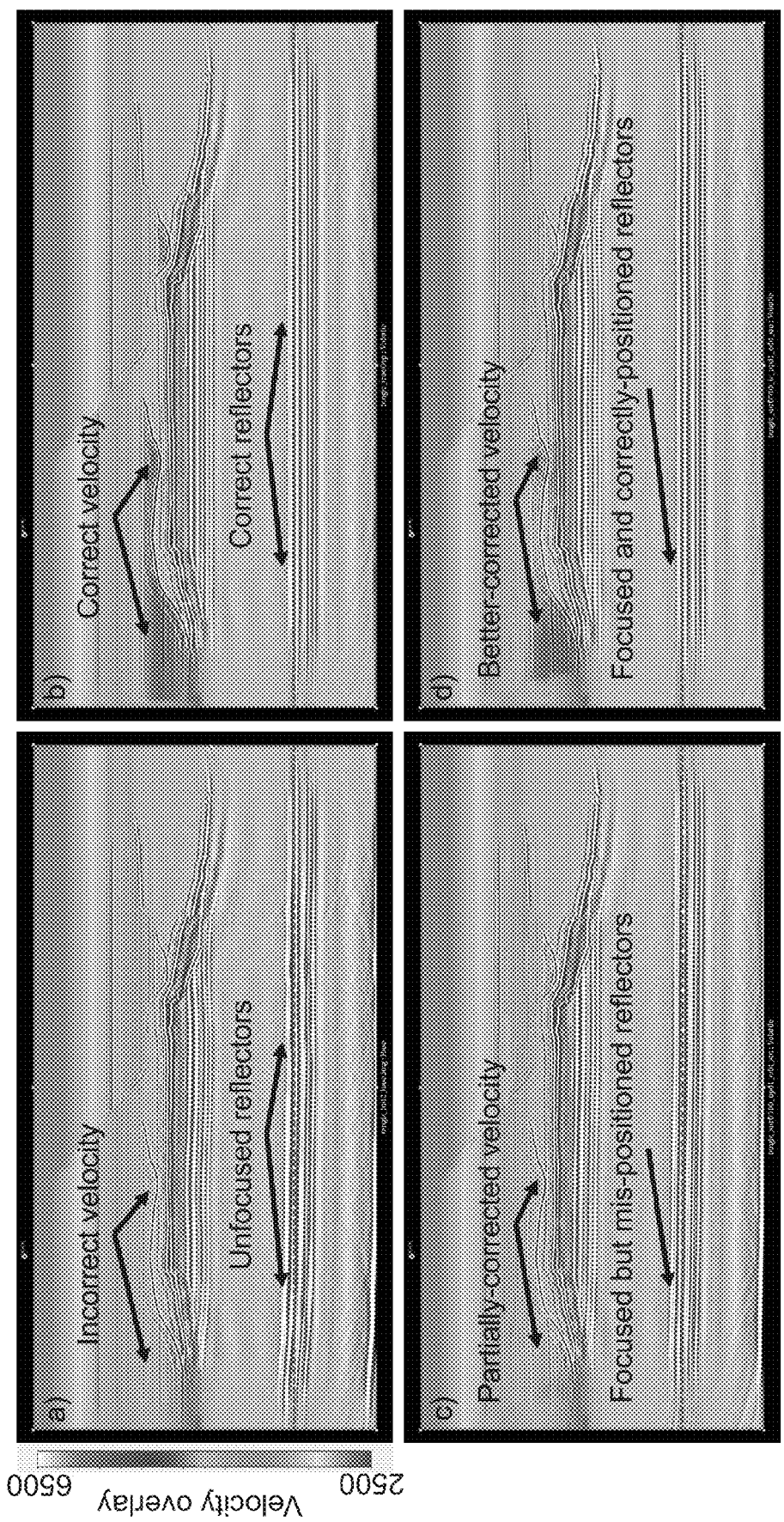
FIG. 6 illustrates a synthetic case where the sub-salt image is improved as a result of some embodiments.

The second example is a pre-salt carbonate case with an under-estimated supra-salt sediment velocity. FIG. 6 panel a) shows an incorrect velocity model with de-focused deep reflectors. FIG. 6 panel b) shows the correct velocity model and corresponding image. FIG. 6 panel c) shows the velocity and image after conventional beam tomography. The deep reflector focuses better than that in FIG. 6 panel a) with improved velocity. On the other hand, the position of the deep reflector is incorrect (correct location is marked by green dash line). FIG. 6 panel d) shows the velocity and image after structurally-constrained beam tomography. In this case, the correct position of the deep reflector is used as a prior in the process. After the process, the deep reflector is positioned correctly, and supra-salt velocity is recovered reasonably well. This case demonstrates the capability of structurally-constrained beam tomography to improve sediment velocity and image carbonate images, based on structural inputs.

Figure 7:
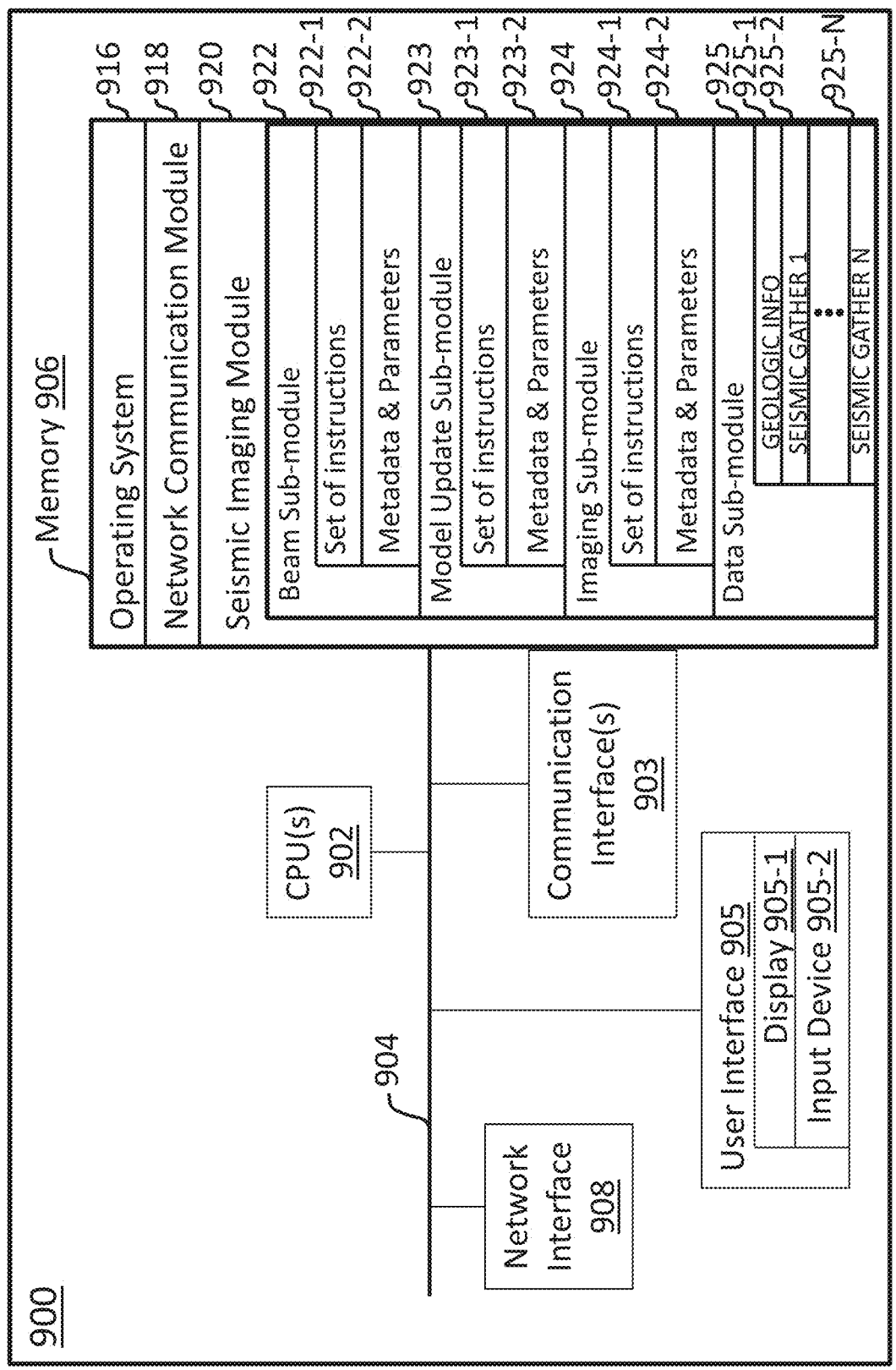
FIG. 7 is a block diagram illustrating a seismic imaging system, in accordance with some embodiments.

FIG. 7 is a block diagram illustrating a seismic imaging system 900, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 900 includes one or more processing units (CPUs) 902, one or more network interfaces 908 and/or other communications interfaces 903, memory 906, and one or more communication buses 904 for interconnecting these and various other components. The seismic imaging system 900 also includes a user interface 905 (e.g., a display 905-1 and an input device 905-2). The communication buses 904 may include circuitry (sometimes called a chipset) that interconnects and controls communications between system components. Memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 906 may optionally include one or more storage devices remotely located from the CPUs 902. Memory 906, including the non-volatile and volatile memory devices within memory 906, comprises a non-transitory computer readable storage medium and may store seismic data, velocity models, seismic images, and/or geologic structure information.

In some embodiments, memory 906 or the non-transitory computer readable storage medium of memory 906 stores the following programs, modules and data structures, or a subset thereof including an operating system 916, a network communication module 918, and a seismic imaging module 920.

The operating system 916 includes procedures for handling various basic system services and for performing hardware dependent tasks.

The network communication module 918 facilitates communication with other devices via the communication network interfaces 908 (wired or wireless) and one or more communication networks, such as the Internet, other wide area networks, local area networks, metropolitan area networks, and so on.

In some embodiments, the seismic imaging module 920 executes the operations of the methods described herein. Seismic imaging module 920 may include data sub-module 925, which handles the geologic information 925-1 and the seismic dataset including seismic gathers 925-2 through 925-N. This data is supplied by data sub-module 925 to other sub-modules.

Beam sub-module 922 contains a set of instructions 922-1 and accepts metadata and parameters 922-2 that will enable it to execute operations for generating seismic beam sets as steps of the embodiments described herein. The model update sub-module 923 contains a set of instructions 923-1 and accepts metadata and parameters 923-2 that will enable it to utilize the seismic beam sets and geological information to update the earth model. The imaging sub-module 924 contains a set of instructions 924-1 and accepts metadata and parameters 924-2 that will enable it to perform seismic imaging using the updated earth model. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 905-1. In addition, any of the seismic data, processed seismic data products, earth models, or seismic images may be transmitted via the communication interface(s) 903 or the network interface 908 and may be stored in memory 906.

The methods described herein are, optionally, governed by instructions that are stored in computer memory or a non-transitory computer readable storage medium (e.g., memory 906 in FIG. 7) and are executed by one or more processors (e.g., processors 902) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the methods are described as being performed by a computer system, although in some embodiments, various operations are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging for identification of and production from hydrocarbon reservoirs, comprising:
   a. receiving, at a computer processor, a seismic dataset representative of a subsurface volume of interest;
   b. receiving, at the computer processor, geological information for the subsurface volume of interest;
   c. transforming, via the computer processor, the seismic dataset into a data beam set;
   d. receiving, at the computer processor, an earth model;
   e. computing, via the computer processor, traveltime variations from the data beam set based on the geological information and the earth model;
   f. deriving, via the computer processor, an updated earth model based on the traveltime variations;
   g. performing, via the computer processor, seismic imaging of the seismic dataset using the updated earth model to generate a seismic image with correctly focused and positioned reflectors; and
   h. identifying geologic features based on the seismic image.

2. The method of claim 1 wherein the transforming the seismic dataset into the data beam set uses ray-tracing from surface locations to subsurface locations or subsurface locations to surface locations.

3. The method of claim 1 wherein the transforming the seismic dataset into the data beam set uses time shifts derived from ray-tracing in the earth model.

4. The method of claim 1 wherein the computing traveltime variations from the data beam set is based on physical data including at least one of well data and petrophysics data.

5. The method of claim 1 wherein the computing the traveltime variations from the data beam set is based on geological constraints and interpretations that conform to a structural evolution of the subsurface volume of interest.

6. The method of claim 1 wherein the computing the traveltime variations includes a similarity measurement between individual traces in the seismic dataset and a representative trace derived based on traces from the seismic dataset or a modeled dataset.

7. The method of claim 6 wherein the similarity measurement is one of cross-correlation, semblance, or dynamic warping.

8. The method of claim 1 wherein the computing the traveltime variations includes using a Monte Carlo approach to select the traveltime variations.

9. The method of claim 1 further comprising iterative repetitions of the transforming the seismic dataset, the computing the traveltime variation wherein the earth model received at the computer processor is the updated earth model from a previous iteration, the deriving the updated earth model, and the seismic imaging, until a maximum number of iterations is reached or similarity of traces is maximized.

10. The method of claim 1 wherein the computing the traveltime variations includes a measurement of traveltime difference, wherein the traveltime difference is the traveltime along ray-paths between initial image positions and desired image positions.

11. The method of claim 1 wherein the deriving the updated earth model comprises updating earth model parameters by distributing traveltime residuals along ray-paths.

12. The method of claim 1 further comprising updating the beam data set based on the updated earth model.

13. The method of claim 1 further comprising drilling at least one well based on the geologic features.

14. A computer system, comprising:
   one or more processors;
   memory; and
   one or more programs, wherein the one or more programs are stored in the memory and configured to be executed by the one or more processors, the one or more programs including instructions that when executed by the one or more processors cause the system to:
   a. receive, at a computer processor, a seismic dataset representative of a subsurface volume of interest;
   b. receive, at the computer processor, geological information for the subsurface volume of interest;
   c. transform, via the computer processor, the seismic dataset into a data beam set;
   d. receive, at the computer processor, an earth model;
   e. compute, via the computer processor, traveltime variations from the data beam set based on the geological information and the earth model;
   f. derive, via the computer processor, an updated earth model based on the traveltime variations; and
   g. perform, via the computer processor, seismic imaging of the seismic dataset using the updated earth model to generate a seismic image with correctly focused and positioned reflectors.

15. A non-transitory computer readable storage medium storing one or more programs, the one or more programs comprising instructions, which when executed by an electronic device with one or more processors and memory, cause the device to
   a. receive, at a computer processor, a seismic dataset representative of a subsurface volume of interest;
   b. receive, at the computer processor, geological information for the subsurface volume of interest;
   c. transform, via the computer processor, the seismic dataset into a data beam set;
   d. receive, at the computer processor, an earth model;
   e. compute, via the computer processor, traveltime variations from the data beam set based on the geological information and the earth model;
   f. derive, via the computer processor, an updated earth model based on the traveltime variations; and
   g. perform, via the computer processor, seismic imaging of the seismic dataset using the updated earth model to generate a seismic image with correctly focused and positioned reflectors.

* * * * *